US012686042B2

(12) United States Patent
Filk et al.

(10) Patent No.: US 12,686,042 B2
(45) Date of Patent: Jul. 21, 2026

(54) ROLL DEVICE FOR ROLLING METAL STRIPS, ROLL ARRANGEMENT FOR USE IN SUCH A ROLL DEVICE AND METHOD FOR CONVERTING A ROLL DEVICE

(71) Applicant: SMS group GmbH, Düsseldorf (DE)

(72) Inventors: Edgar Filk, Netphen (DE); Markus Gümpel, Forst (DE)

(73) Assignee: SMS group GmbH, Düsseldorf (DE)

( * ) Notice: Subject to any disclaimer, the term of this patent is extended or adjusted under 35 U.S.C. 154(b) by 359 days.

(21) Appl. No.: 18/037,074

(22) PCT Filed: Sep. 20, 2021

(86) PCT No.: PCT/EP2021/075740
§ 371 (c)(1),
(2) Date: May 15, 2023

(87) PCT Pub. No.: WO2022/106093
PCT Pub. Date: May 27, 2022

(65) Prior Publication Data
US 2023/0415211 A1 Dec. 28, 2023

(30) Foreign Application Priority Data
Nov. 17, 2020 (DE) ...................... 10 2020 214 383.8

(51) Int. Cl.
B21B 31/10 (2006.01)
B21B 13/02 (2006.01)
B23P 6/00 (2006.01)

(52) U.S. Cl.
CPC .............. B21B 31/10 (2013.01); B21B 13/02 (2013.01); B23P 6/00 (2013.01); B21B 2267/06 (2013.01)

(58) Field of Classification Search
CPC ......... B21B 31/10; B21B 13/02; B21B 13/14; B21B 13/145; B21B 2267/06; B23P 6/00
See application file for complete search history.

(56) References Cited

U.S. PATENT DOCUMENTS 4,531,394 A * 7/1985 Turley .................. B21B 13/145
72/243.4
4,552,008 A 11/1985 Schlatter et al.
(Continued)

FOREIGN PATENT DOCUMENTS

CN 1310061 A 8/2001
EP 2612716 A1 7/2013
(Continued)

OTHER PUBLICATIONS

English translate (JPH02299708A), retrieved date Dec. 21, 2025.*

*Primary Examiner* — Mohammed S. Alawadi
(74) *Attorney, Agent, or Firm* — Smartpat PLC

(57) ABSTRACT
A roll device for rolling metal strips comprises a first and a second work roll which define a roll gap therebetween, and a first and a second backup roll. In a common rolling mill stand, at least one work roll is mounted in work roll chocks and the backup rolls are mounted in backup roll chocks. The work roll chocks are designed such that the first and/or the second work roll can each be replaced by a roll arrangement having a work roll with a smaller diameter and at least one additional roll. The work roll with the smaller diameter is supported via the additional roll. The additional roll is mounted in additional roll chocks and the work roll with the smaller diameter is situated in work roll bearings of the additional roll chocks.

15 Claims, 5 Drawing Sheets

(56)              References Cited

U.S. PATENT DOCUMENTS

| | | | |
|---|---|---|---|
| 5,842,368 A | 12/1998 | Barten et al. | |
| 2001/0018840 A1* | 9/2001 | Nihei | B21B 13/145 |
| | | | 72/243.4 |
| 2008/0115551 A1* | 5/2008 | Marc | B21B 13/001 |
| | | | 72/229 |

FOREIGN PATENT DOCUMENTS

| | | | | |
|---|---|---|---|---|
| JP | S5691910 | A | | 7/1981 |
| JP | S62161413 | A | | 7/1987 |
| JP | S63085306 | U | | 6/1988 |
| JP | H01262005 | A | | 10/1989 |
| JP | H02121705 | U | | 10/1990 |
| JP | H02299708 | A | * | 12/1990 |
| JP | 2001232402 | A | | 8/2001 |
| JP | 3249417 | B2 | | 1/2002 |
| JP | 3283823 | B2 | | 5/2002 |

* cited by examiner

ROLL DEVICE FOR ROLLING METAL STRIPS, ROLL ARRANGEMENT FOR USE IN SUCH A ROLL DEVICE AND METHOD FOR CONVERTING A ROLL DEVICE

CROSS-REFERENCE TO RELATED APPLICATION

This application is a national stage application, filed under 35 U.S.C. § 371, of International Patent Application PCT/EP2021/075740, filed on Sep. 20, 2021, which claims the benefit of German Patent Application DE 10 2020 214 383.8, filed on Nov. 17, 2020.

TECHNICAL FIELD

The disclosure relates to a roll device for rolling metal strips, comprising at least a first and a second work roll which define a roll gap therebetween, and at least a first and a second backup roll, wherein, in a common rolling mill stand, the work rolls are mounted in work roll chocks and the backup rolls are mounted in backup roll chocks.

BACKGROUND

For cold rolling of higher-strength and thin metal strips with high thickness reduction, rolling mill stands in convertible 18-HS or 20-HS design with 18 or 20 rolls are frequently used. Such rolling mill stands comprise relatively small work rolls, but are technically complex and require high maintenance. Conversion from a 4-roll configuration to a multi-roll configuration is costly.

High-strength and thin strips made of special alloys are niche products, such that the use of special multi-rolling mill stands such as Sendzimir design is often not economical.

All such rolling mill stand designs have in common that the small work rolls are installed in the rolling mill stand without their own mounting, and the vertical and lateral fixing and guiding is carried out by additional devices, in particular by backup rolls. In the prior art, the small work rolls without bearings are manually inserted into or removed from, as the case may be, the rolling mill stand.

SUMMARY

The disclosure is based on the object of providing a roll device of the type mentioned above, which enables the rolling of high-strength and thin metal strips with a high thickness reduction by relatively simple means.

The disclosure is further based on the object of providing a roll device that can be converted relatively easily for different requirements.

The object is achieved with the features of the independent claims. Advantageous embodiments arise from the subclaims.

One aspect of the disclosure relates to a roll device for rolling metal strips comprising at least a first and a second work roll which define a roll gap therebetween, and at least a first and a second backup roll, wherein, chocks in a common rolling mill stand, at least one work roll is mounted in work roll chocks and the backup rolls are mounted in backup roll chocks, wherein the work roll chocks are designed such that the first and/or the second work roll can each be replaced for a roll arrangement having a work roll with a smaller diameter and at least one additional roll, wherein the work roll with the smaller diameter is supported via the additional roll, the additional roll is mounted in additional roll chocks and the work roll with the smaller diameter is situated in work roll bearings of the additional roll chocks.

It is proposed to design the roll device in such a manner that a given pair of work rolls of the rolling mill stand with larger roll diameters can be converted in such a manner that one and/or both work rolls can be replaced by a work roll with a smaller diameter and an additional roll. This allows various configurations of the roll device to be realized. With a variant of the roll device in which both the first and the second work roll are replaced by a roll arrangement with a work roll with a smaller diameter and an additional roll, a symmetrical pair of work rolls with smaller work rolls is thus achieved overall, with which a relatively high thickness reduction can already be achieved.

Due to the independent mounting of the smaller diameter roll in associated work roll bearings, the position of this work roll can be precisely defined both axially and vertically with respect to the additional roll and/or with respect to the work roll cooperating with it to form the roll gap. As a result, particularly stable rolling conditions are established. Due to the position stability not only during rolling, but also upon a roll change, the setting of the pair of work rolls can be carried out particularly easily. In this respect, the invention is also particularly suitable for modernization of an existing plant to expand the product range.

Preferably, the position of the work roll bearings within the roll arrangement is adjustable, as is thus the position of the smaller diameter work roll. The work roll bearings fulfill the function of smaller "work roll chocks" that are displaceable within and with the additional roll chocks.

Particularly preferably, the position of the work roll bearings can be adjusted axially and/or transversely to the longitudinal extension of the roll gap.

This ensures that the position of the axis of rotation of the work roll in the roll arrangement can be adjusted or set, as the case may be, relative to the position of the axis of rotation of the additional roll.

Such an adjustment may be necessary, for example, to set a so-called "offset." This is understood to mean an axis center offset or, as the case may be, an offset of the longitudinal center axis of the additional roll on the one hand and the longitudinal center axis of the work roll on the other hand, which is intended to improve the stability of the arrangement against horizontal deflection. In principle, an offset can be set by means of wear plates or shims of different thicknesses, each of which is provided in pockets or recesses of the work roll chocks of the roll arrangement. Alternatively, hydraulic piston-cylinder arrangements may be provided for this purpose.

The work roll bearings can be supported on viscoelastic buffers, which lift the work roll of the roll arrangement off the additional roll as soon as they are load-free, such that surface contact between the work roll and the additional roll of the roll arrangement during installation and removal of the roll arrangement is thereby avoided.

In a favorable and preferred variant of the roll device, either the first or the second work roll is replaced by a roll arrangement comprising a work roll with a smaller diameter and an additional roll. Particularly preferred is a roll device comprising a first, upper work roll with a relatively large diameter and a lower roll arrangement with a work roll of smaller diameter. Such asymmetrical configuration of the work rolls with a first upper work roll of relatively large diameter and a second lower work roll of relatively small diameter has proved to be particularly favorable with regard to the thickness reduction to be achieved. Such a diameter ratio of the work rolls is advantageous in that a rolling result that corresponds to a rolling pass with a pair of work rolls with which the diameter of each work roll corresponds to the arithmetic mean of the diameters of a larger and a smaller work roll can be achieved.

Preferably, the additional roll has a larger diameter than the work roll of the roll arrangement.

In a preferred and expedient variant of the roll device, it is provided that the first or the second work roll is designed as a work roll with a smaller or larger diameter and that the work roll with the smaller diameter has a diameter that is smaller than or equal to half the diameter of the large work roll.

Expediently, the roll device is designed in such a manner that the additional roll chocks of the roll arrangement have an outer contour that approximately corresponds to the outer contour of the work roll chocks for a single work roll with a larger diameter. Such configuration ensures, in particular, that the roll device can be easily converted. This ensures that the additional roll chocks of the roll arrangement can be accommodated interchangeably in the installation space of the work roll chocks within the rolling mill stand of the roll device. No conversion work is required within the stand region.

In an advantageous embodiment of the roll device, it is provided that the first or second work roll is mounted in pockets or recesses on the side of the additional roll chocks of the roll arrangement turned towards the roll gap in the installed position. This ensures that no further adaptation of any bending or balancing devices provided for the work rolls and/or backup rolls is necessary.

Due to the configuration of the roll arrangement, which is designed as an independent functional unit, a roll change, which is also a configuration change at the same time, can be realized easily and quickly by conventional means, and preferably fully automatically.

In principle, it can be provided to support the work roll with the smaller diameter along at least part of the roll barrel on one or both sides. Smaller diameter work rolls tend to bend transversely to the direction of strip travel across the barrel length transverse to its longitudinal axis.

This can be taken into account in that the first or second work roll is movably mounted in the additional roll chocks of the roll arrangement transversely to the axis of rotation and is supported on at least one side parallel to the axis of rotation over at least part of its length by means of at least one hydrostatic support bearing. The offset can also be set by means of the hydrostatic support bearing.

With this design variant, the hydrostatic support bearing has a dual function. It compensates for the deflection of the small work roll and sets the axial position of the axis of rotation of the work roll relative to the axis of rotation of the additional roll.

Preferably, the hydrostatic support bearing comprises at least one support shell extending over a substantial part of the barrel length of the work roll of the roll arrangement. The support shell is preferably sealed at each end on the steady rest seat of the work roll of the roll arrangement. Alternatively, the support shell can be sealed against spacers in the region of the mounting of the work roll of the roll arrangement.

A lateral seal of the support shell serves the purpose of maintaining a constant pressure of the hydraulic medium between the support shell and the work roll. The hydraulic medium can be, for example, the rolling emulsion or roll oil normally used for roll cooling and lubrication.

With an advantageous embodiment of the roll device, it is provided that the support shell is set and/or held against the work roll via at least one, preferably hydraulic, setting device. The setting device can be provided as an additional device or external device, as the case may be, on the roll device.

For example, at least one guide element for the rolled material provided on the roll device or in the rolling train can be provided or designed as a setting device.

With a particularly advantageous embodiment of the roll, it is provided that at least one setting device is provided in a movable table or strip deflector associated with the roll device and situated on the inlet side and/or outlet side. It is sensible to integrate a setting device into a guide table for the rolled material.

The setting device can comprise a plurality of adjusting cylinders, which act on the support shell with actuating elements.

The additional roll chock of the roll arrangement and/or at least one work roll bearing of the roll arrangement can comprise at least one media coupling for lubricant and/or coolant and/or another hydraulically active medium.

The disclosure further relates to a roll arrangement for use in a roll device for rolling metal sheets of the type described above. The roll arrangement comprises at least one additional roll and at least one work roll, wherein the additional roll is mounted in additional roll chocks and the work roll is situated in work roll bearings of the additional roll chocks.

Preferably, the additional roll has a larger diameter than the work roll.

In order to ensure that the roll arrangement has a configuration that corresponds approximately to the configuration of a work roll to be replaced, it is provided that the work roll bearings are situated in pockets on the side of the additional roll chocks turned towards the roll gap in the installed position.

The work roll can, for example, be movably mounted in the work roll bearings transverse to the longitudinal extension of the roll gap and supported on at least one side parallel to the axis of rotation over at least a part of its length by means of at least one hydrostatic support bearing.

The work roll can be adjustable transversely and/or vertically with respect to the additional roll.

For this purpose, it can be provided that the work roll bearings in the additional roll chock can be adjusted transversely and/or vertically.

Expediently, at least one of the additional roll chocks and/or at least of the work roll bearings, preferably both in each case, is provided with at least one media coupling or media connection for the introduction of a hydraulic medium. The hydraulic media to be considered are lubricant and/or rolling emulsion for cooling and lubricating the work rolls and as a medium for maintaining the hydrostatic pressure within the hydrostatic support bearing.

The roll arrangement preferably has one or more of the features disclosed above in connection with the roll device.

Finally, the disclosure relates to a method for converting a roll device for rolling metal strips, which comprises at least a first and a second work roll which define a roll gap therebetween and which further comprises at least a first and a second backup roll, wherein, in a common rolling mill stand, the work rolls are mounted in work roll chocks and the backup rolls are mounted in backup roll chocks, wherein the first and/or second work roll is replaced by a roll arrangement, which comprises an additional roll supporting the work roll situated in work roll bearings, wherein the diameter of the work roll of the roll arrangement is smaller than the diameter of the work roll to be replaced and the outer dimensions of the additional roll chocks of the roll arrangement largely correspond to those of the work roll chocks of the work roll to be replaced.

The invention is explained below with reference to an exemplary embodiment shown in the figures.

DETAILED DESCRIPTION

Figure 1:
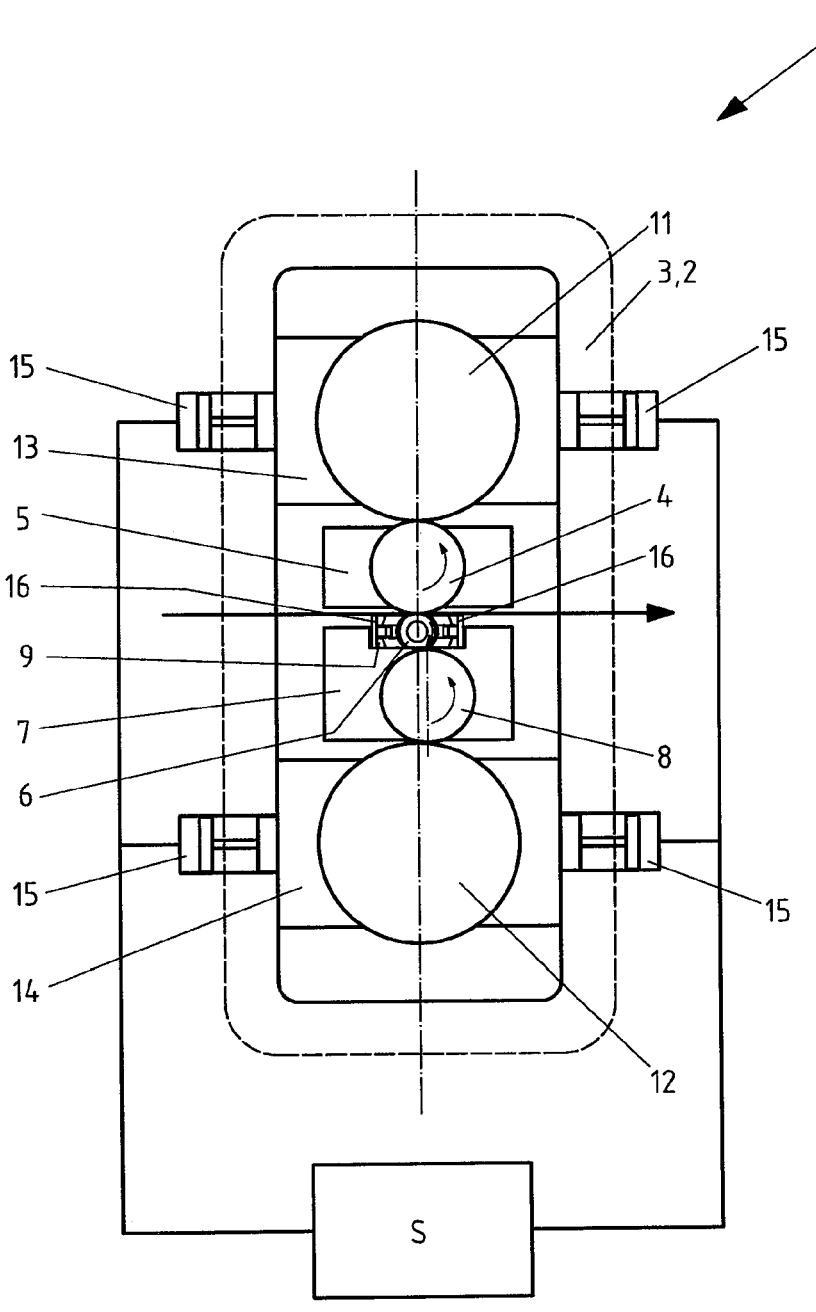
FIG. 1 is a schematic and simplified illustration of a rolling device.

The roll device 1 comprises a rolling mill stand 2 with a roller stand 3, within which an upper (large) work roll 4 is mounted in upper work roll chocks 5 and a lower (small) work roll 6 is mounted in a common roll chock with an additional roll 8. A roll gap W is formed between the work rolls 4,6, through which the rolled material, which is not shown, is passed in the form of a metal strip.

In a known manner, the roll device 1 comprises both bending cylinders and balancing cylinders, with which compensation can be made for a bending of the work rolls and the weight force of the backup rolls. For reasons of simplification, such devices are not shown in the drawings. In addition, the roll device comprises means for axial displacement of the work rolls 4,6, which are also not shown in the drawings for reasons of simplification.

For the purposes of this patent application, axial displacement or adjustment means displacement in the direction of the longitudinal axis of the rolls concerned. Vertical displacement or adjustment within the meaning of this patent application is to be understood as an adjustment transverse to the longitudinal extension of the roll gap W.

In the vertical direction, the upper work roll 4 is supported against an upper backup roll 11, whereas the lower work roll 6 is supported against a lower additional roll 8. The additional roll 8 is supported against a lower backup roll 12. The upper backup roll 11 is mounted in upper backup roll chocks 13 and the lower backup roll 12 is mounted in lower backup roll chocks 14. The combination of the lower work roll 6 and the additional roll 8 form a roll arrangement 10 within the meaning of the present disclosure. The roll arrangement 10 comprises an additional roll chock 7, in which the smaller diameter lower work roll 6 is mounted. The mounting of the work roll 6 is accomplished by work roll bearings 9 of the additional roll chocks 7.

The work rolls 4, 6 reduce the thickness of the rolled material in a manner known per se. The roll device 1 is preferably designed as a device for cold rolling metal strips and is designed for a relatively high thickness reduction.

To stabilize the entire set of rolls, both the upper backup roll chock 13 and the lower backup roll chock 14 are subjected to a force parallel to their longitudinal center axes within the roller stand 3 by means of pusher cylinders 15 known per se, which counteracts lateral deflection of the backup rolls 11, 12. Such stabilization is particularly advantageous because of the odd number of rolls in the set of rolls. By means of the pusher cylinders 15, an offset (longitudinal center offset) of the longitudinal center axes of the backup rolls 11, 12 relative to the longitudinal center axes of the work rolls 4, 6 can be set in a known manner. Due to the possible variable offset directions, the effective directions of the pusher cylinders 15 must be recalculated for each application and load case. This is effected through a control unit S of the roll device 1.

In the configuration of the roll device 1 shown in FIG. 1, it is provided that the lower work roll 6 has approximately half the diameter of the upper work roll 4. The diameter of the additional roll 8 is slightly smaller than the diameter of the upper work roll 4. As will be further described below, the roll device 1 can be converted between different configurations with different pairs of rolls. This has the advantage that a roll device 1 with a pair of rolls for rolling less strong strips with relatively low thickness reduction can be converted by simple means if higher strength and thinner strips made of special alloys or with a higher thickness reduction are to be rolled.

Figures 2A, 2B, 3:
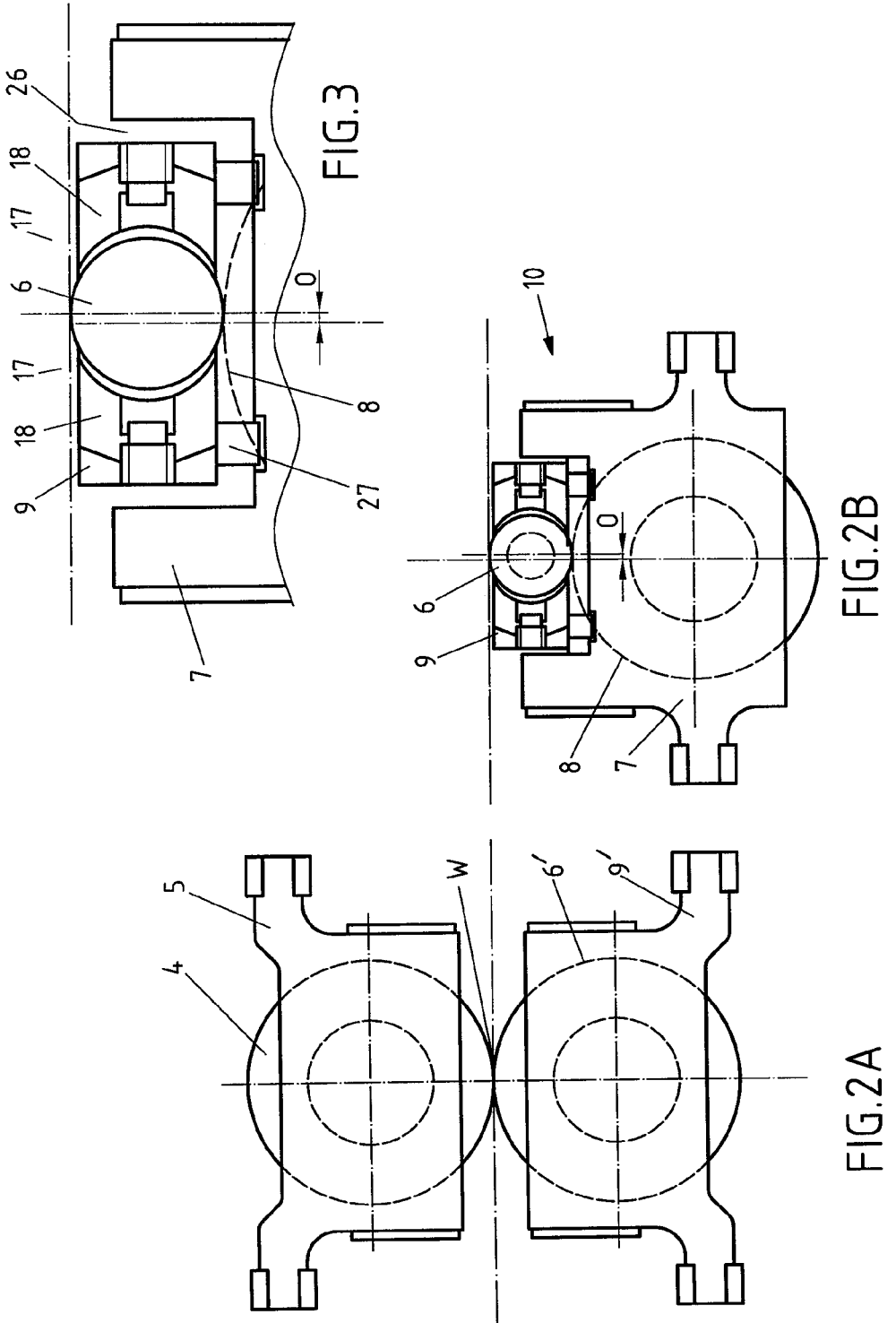
FIG. 2A is an illustration of a conventional pair of work rolls.
FIG. 2B shows a roll arrangement.
FIG. 3 is an enlarged view of the mounting of the work roll of the roll arrangement in accordance with FIG. 2B.

The configuration of the various pairs of rolls of the roll device can be seen in particular in FIGS. 2A and 2B. FIG. 2A shows a front view of a conventional pair of work rolls comprising a first upper work roll 4 and a second lower work roll 6', wherein the upper work roll 4 is mounted in an upper work roll chock 5 and the lower work roll 6' is mounted in a lower work roll chock 9'. Both work rolls 4,6' have the same diameter and accordingly form a symmetrical pair of work rolls.

It is provided that the roll device 1 can be converted in such a manner that either the upper work roll 4 with the associated upper work roll chocks 5 or the lower work roll 6' with the associated lower work roll chocks 9' is replaced by the roll arrangement 10 in accordance with FIG. 2B. Such configuration is shown in FIG. 1.

The roll arrangement 10 in accordance with FIG. 2B comprises additional roll chocks 7, whose outer dimensions and geometry correspond approximately to the geometry of the work roll chocks 4, 6' of the conventional pair of work rolls in accordance with FIG. 2A. This is made possible in particular by the fact that the additional roll 8, the diameter of which corresponds approximately to the diameter of the upper work roll 4 or is slightly smaller, is mounted in the lower additional roll chocks 7 corresponding to the upper work roll 4 in the upper work roll chocks. The lower work roll 6 is mounted in work roll bearings 9, each of which is situated in pockets 26 on the upper side of the additional roll chocks 7 turned towards the roll gap W.

With the variant of the roll device 1 in accordance with FIG. 1, it is provided that the position of the axis of rotation of the lower work roll 6 is adjustable by means of exchangeable wear plates 16.

With the variant of the roll arrangement 10 shown in FIG. 2B, it is provided that the lower work roll 6 is movably mounted transversely to its longitudinal axis and is centered within the pockets 26 by means of a hydrostatic bearing 17.

As can be seen in particular from FIG. 3, which shows a detailed view from FIG. 2B, the hydrostatic bearing 17 comprises two support shells 18 extending substantially along the entire length of the barrel of the lower work roll 6 and sealed against the lower work roll 6. Via media connections described below, the hydrostatic bearing 17 is supplied with coolant/lubricant, for example rolling emulsion, such that it is ensured that the support shells 18 enclose the work roll 6 between them in such a manner that they do not rest on the surface of the work roll 6. In addition, a lateral sealing (not shown) of the support shells 18 is provided, which is supported on the steady rest seat of the lower work roll 6, such that it is ensured that the support shells 18 do not rest against the work roll 6 if no media pressure is built up.

Furthermore, the additional roll chock 7 has receptacles for viscoelastic buffers 27 in the lower region of the pocket 26, which lift off the small work roll 6 with the associated work roll bearings 9 as soon as they are load-free. This ensures that there is no surface contact between the work roll 6 and the additional roll 8 during the roll change, which could affect the surface finish of the smaller work roll 6.

With the embodiment described, the small work roll 6 has two hydrostatic bearings 17, one on the inlet side and one on the outlet side of the roll device 1. A single-sided or double-sided supply of the support shells 18 can be optionally provided. In other embodiments, a single-sided arrangement can also be provided.

Figure 4:
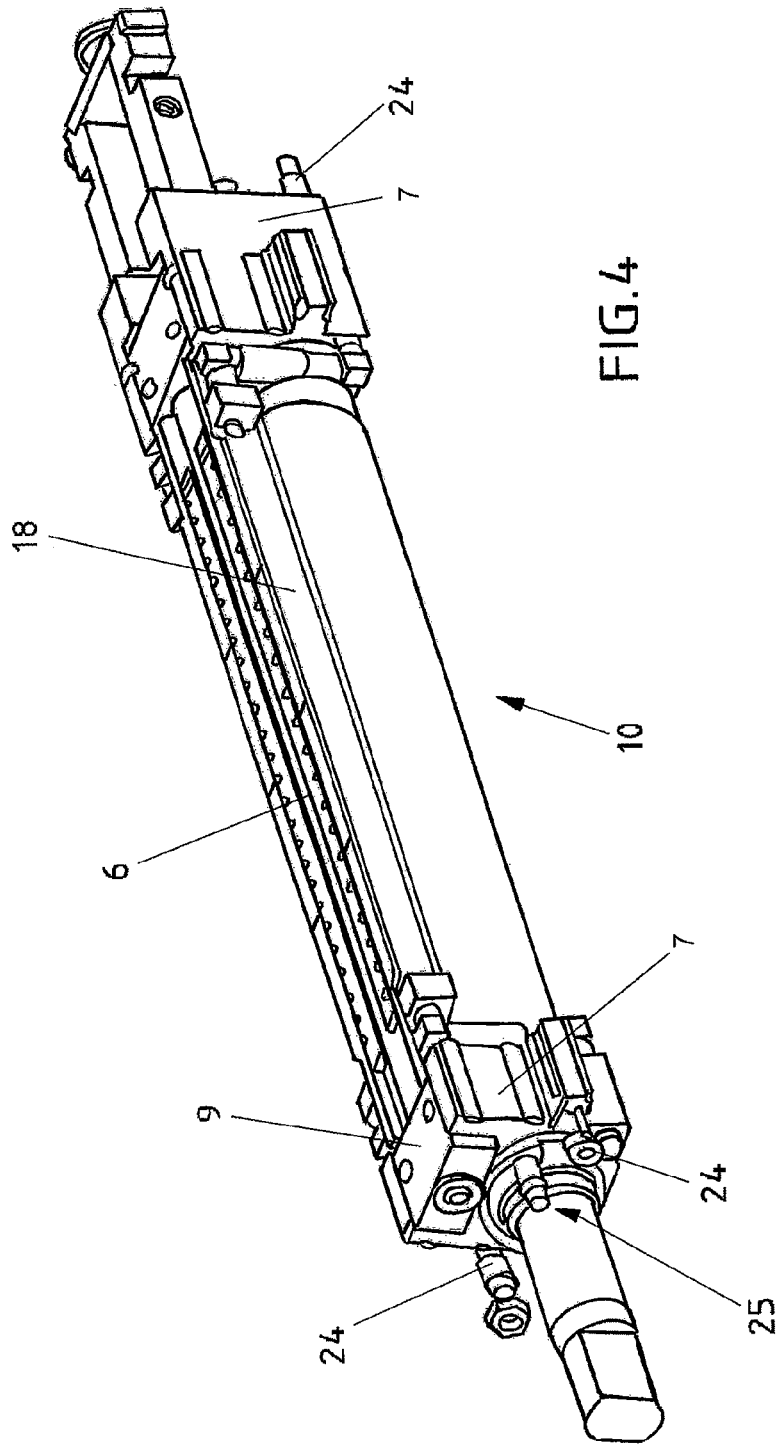
FIG. 4 is a schematic illustration of a roll arrangement.

FIG. 4 shows schematic illustration of a roll arrangement 10. The additional roll chocks 7 of the roll arrangement are provided with first media couplings 24 for supplying pressure to the hydrostatic bearing 17 and second media couplings 25 for providing a coolant and/or lubricant to the rolling bearings of the lower work roll 6 and the additional roll 8.

For example, the rolling emulsion can be circulated through the hydrostatic bearing 17 at a flow rate of approximately 1000 l/min as a medium for supplying pressure.

Figure 5:
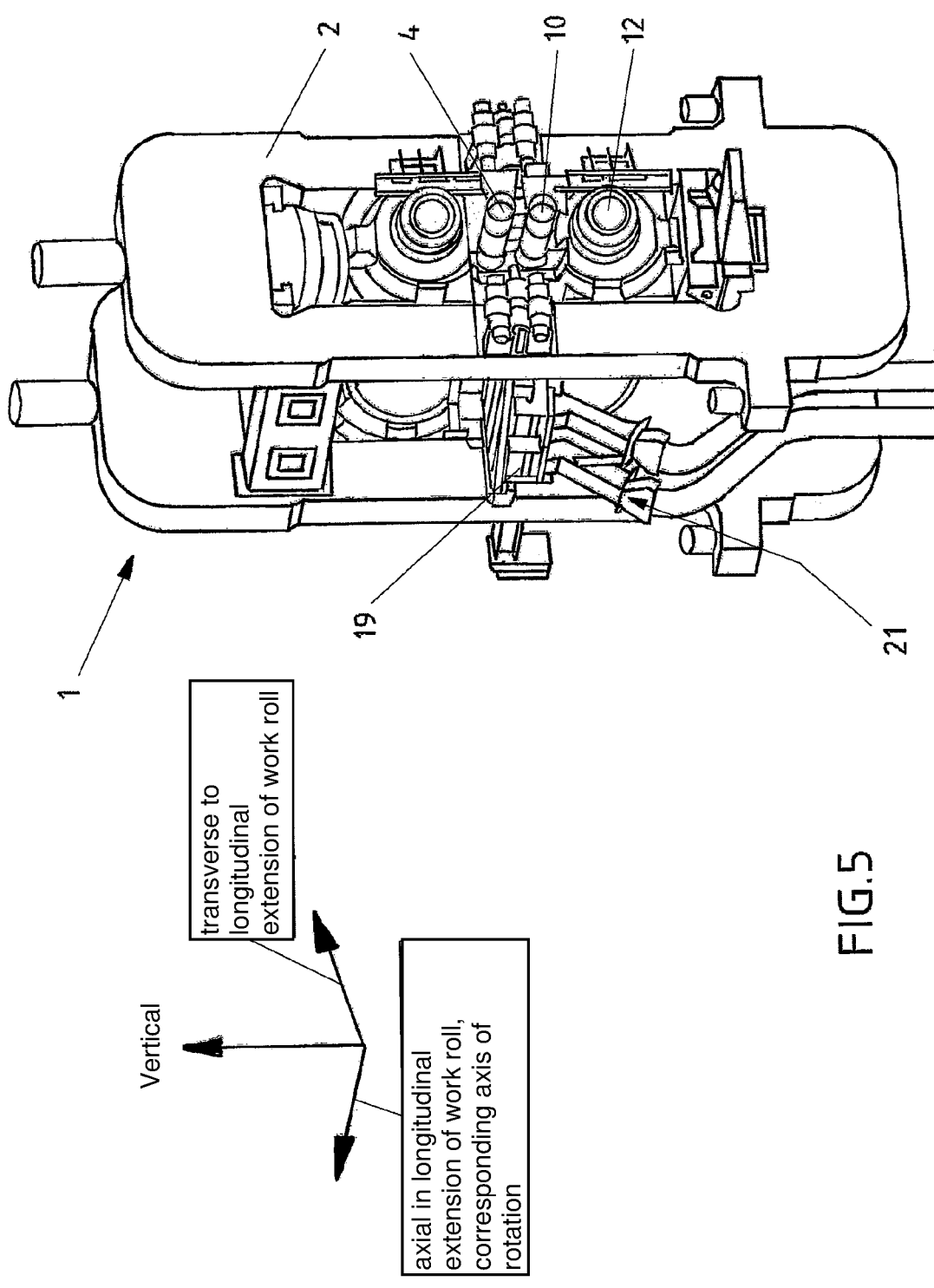
FIG. 5 is a perspective view of the roll device in accordance with FIG. 4 as seen from the drive side.

As can be seen from FIG. 5, the roll device 1 comprises a guide table 19 at least on one side for guiding the rolled material. The guide plane of the guide table 19 extends approximately at the height of the shell surface of the lower work roll 6. Means are provided on the guide table 19 for adjusting and/or centering a support shell 18 of the hydrostatic bearing 17 in the form of an adjusting beam 20, which is situated so as to be displaceable relative to the guide table 19 by means of feed cylinders 21.

Figure 6:
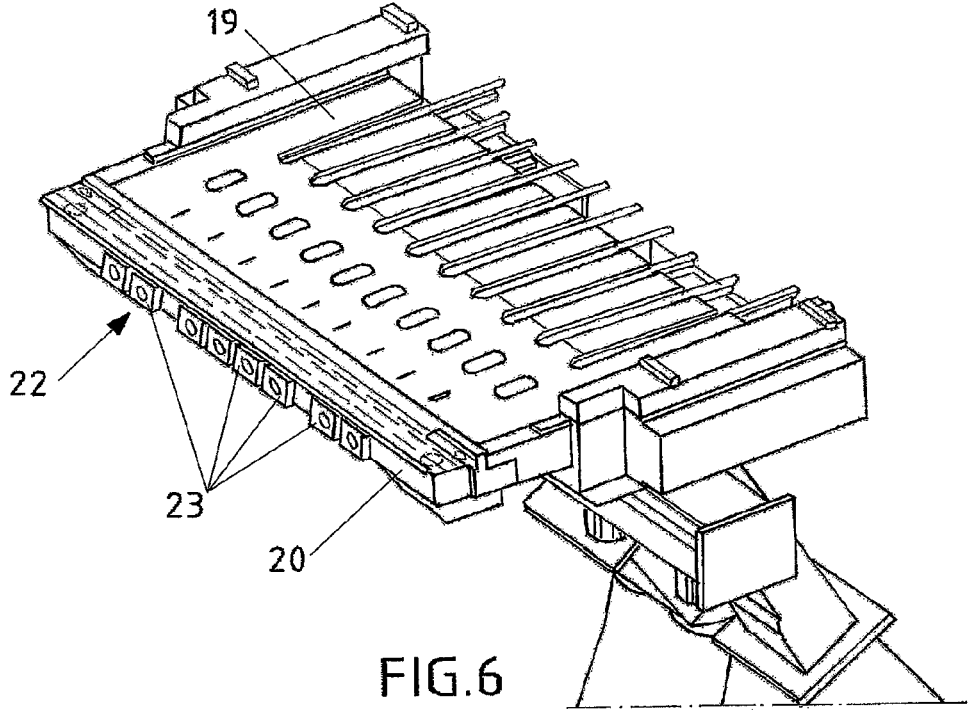
FIG. 6 is a perspective illustration of a guide table for guiding the rolled material with a setting device.
Figure 7:
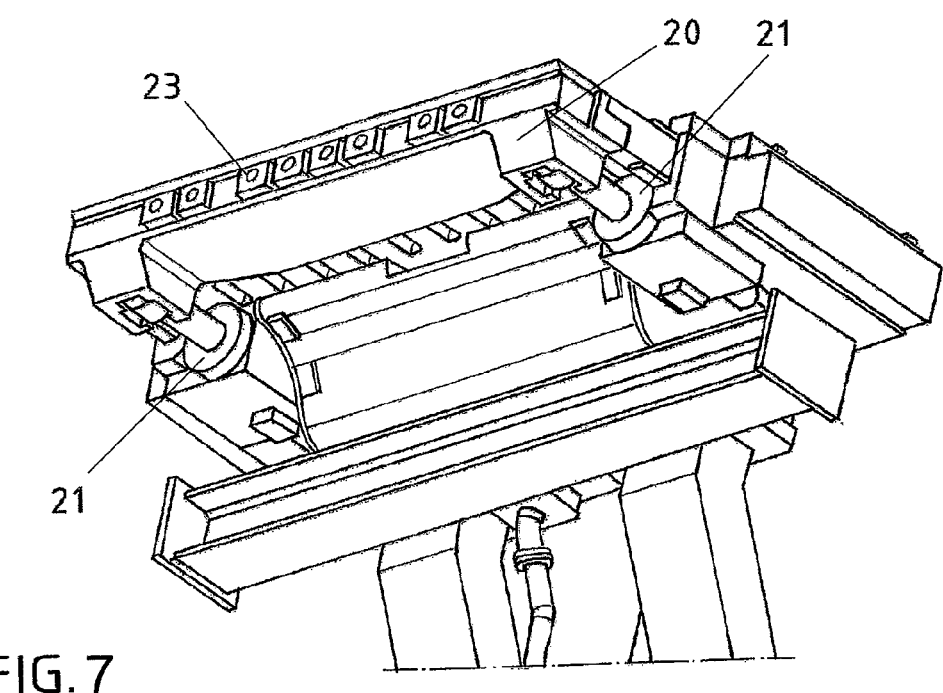
FIG. 7 is a further perspective illustration of the guide table in accordance with FIG. 6.

The guide table 19 is shown in enlarged perspective in FIGS. 6 and 7. Feed cylinders 21, which are situated on the underside of the guide table 19 (see FIG. 7), can be used to position the adjusting beam 20 in relation to a support shell 18. The adjusting beam 20 further comprises a plurality of adjusting cylinders 22, which act on the respective support shell 18 of the hydrostatic bearing 17 by means of slides 23. By means of the adjusting cylinders 22, the counterpressure on the support shell 18 of the hydrostatic bearing 17 can be set over the entire length of the barrel of the lower work roll 6. With the roll device 1, a guide table 19 can be provided both on the inlet side and on the outlet side.

The setting of the support shells 18 of the hydrostatic bearing 17 is effected with the adjusting beams attached to the guide table 19, such that additional adjusting means to be provided on the roll arrangement 10 are unnecessary. This allows the roll arrangement 10 to be compact and without additional adjusting means.

LIST OF REFERENCE SIGNS

1 Roll device
2 Rolling mill stand
3 Roller stand
4 Upper work roll
5 Upper work roll chock
6 Lower work roll
6' Lower work roll of a conventional pair of work rolls

7 Additional roll chock
8 Additional roll
9 Work roll bearing
9 Lower work roll chock
10 Roll arrangement
11 Upper backup roll
12 Lower backup roll
13 Upper backup roll chock
14 Lower backup roll chock
15 Pusher cylinder
16 Wear plates
17 Hydrostatic bearing
18 Support shells
19 Guide table
20 Adjusting beam
21 Feed cylinder
22 Adjusting cylinder
23 Slide
24 First media coupling
25 Second media coupling
26 Pockets
27 Viscoelastic buffers
S Control device
W Roll gap
O Offset

The invention claimed is:

1. A five-high rolling mill stand for rolling metal strips, comprising:
   a rolling mill stand (2);
   an upper backup roll (11) mounted to the rolling mill stand (2) by upper backup roll chocks (13);
   an upper work roll (4), the upper work roll (4) being directly supported by the upper backup roll (11) and mounted to the rolling mill stand (2) by upper work roll chocks (5);
   a lower work roll (6), the lower work roll (6) having a smaller diameter than the upper work roll (4);
   a lower backup roll (12) mounted to the rolling mill stand (2) by lower backup roll chocks (14);
   an additional roll (8) arranged between the lower work roll (6) and the lower backup roll (12) for indirectly supporting the lower work roll (6), the additional roll (8) being mounted by additional roll chocks (7); and
   a roll gap (W) between the upper work roll (4) and the lower work roll (6),
   wherein the lower work roll (6) is situated in lower work roll bearings (9) of the additional roll chocks (7), and
   wherein the additional roll (8) and the lower work roll (6) form a replaceable roll arrangement (10),
   wherein the lower work roll bearings (9) are disposed in upwardly open pockets (26) of the additional roll chocks (7), and
   wherein a position of the lower work roll bearings (9) within the replaceable roll arrangement (10) is adjustable by exchangeable wear plates (16) or by a hydraulic setting device.

2. The five-high rolling mill stand according to claim 1, wherein a position of the lower work roll bearings (9) within the replaceable roll arrangement (10) is adjustable by the exchangeable wear plates (16).

3. The five-high rolling mill stand according to claim 2, wherein the lower work roll bearings (9) are disposed in upwardly open pockets (26) of the additional roll chocks (7), and
   wherein the position of the lower work roll bearings is adjusted axially and/or transversely to a longitudinal extension of the roll gap (W).

4. The five-high rolling mill stand according to claim 1, wherein the additional roll (8) has a larger diameter than the lower work roll (6) of the replaceable roll arrangement (10).

5. The five-high rolling mill stand according to claim 1, wherein the lower work roll (6) has a diameter that is smaller than or equal to half the diameter of the upper work roll (4').

6. The five-high rolling mill stand according to claim 5, wherein the diameter of the additional roll (8) is smaller than or equal to the diameter of the upper work roll (4).

7. The five-high rolling mill stand according to claim 1, wherein the lower work roll bearings (9) are situated in pockets (26) on a side of the additional roll chocks (7) turned towards the roll gap (W) in an installed position.

8. The five-high rolling mill stand according to claim 1, wherein the lower work roll (6) of the replaceable roll arrangement (10) is supported on at least one side parallel to an axis of rotation of the lower work roll (6) over at least part of a length of the lower work roll (6) by a hydrostatic support bearing (17).

9. The five-high rolling mill stand according to claim 8, wherein a position of an axis of rotation of the lower work roll (6) in the lower work roll bearings (9) of the replaceable roll arrangement (10) is adjusted relative to a position of an axis of rotation of the additional roll (8).

10. The five-high rolling mill stand according to claim 9, wherein the lower work roll (6) is movably mounted in the lower work roll bearings (9) of the replaceable roll arrangement (10) transversely to the axis of rotation of the lower work roll (6) and is positioned by a support shell (18) of the hydrostatic support bearing (17).

11. The five-high rolling mill stand according to claim 10, wherein the support shell (18) extends over a substantial part of a barrel length of the lower work roll (6).

12. The five-high rolling mill stand according to claim 11, wherein the support shell (18) is set and/or held against the lower work roll (6) via the hydraulic setting device.

13. The five-high rolling mill stand according to claim 12, wherein at least one guide element for a rolled material is provided as a setting device.

14. The five-high rolling mill stand according to claim 13, wherein the setting device comprises a plurality of adjusting cylinders (22), which act on the support shell (18) with actuating elements (23).

15. The five-high rolling mill stand according to claim 1, wherein at least one of the additional roll chocks (7) and/or at least one of the lower work roll bearings (9) of the replaceable roll arrangement (10) comprises at least one media coupling (24, 25).

\*  \*  \*  \*  \*